(12) United States Patent
Iwamoto et al.

(10) Patent No.: US 9,968,965 B2
(45) Date of Patent: May 15, 2018

(54) STRUCTURE HAVING LIQUID FILM ON THE SURFACE THEREOF

(71) Applicant: TOYO SEIKAN GROUP HOLDINGS, LTD., Tokyo (JP)

(72) Inventors: Shinya Iwamoto, Yokohama (JP); Yosuke Akutsu, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days. days.

(21) Appl. No.: 15/306,345

(22) PCT Filed: Apr. 14, 2015

(86) PCT No.: PCT/JP2015/061451
§ 371 (c)(1),
(2) Date: Oct. 24, 2016

(87) PCT Pub. No.: WO2015/163189
PCT Pub. Date: Oct. 29, 2015

(65) Prior Publication Data
US 2017/0043372 A1   Feb. 16, 2017

(30) Foreign Application Priority Data

Apr. 25, 2014  (JP) .................................. 2014-091894

(51) Int. Cl.
*B05D 5/08* (2006.01)
*B05D 5/02* (2006.01)
(Continued)

(52) U.S. Cl.
CPC ................. *B05D 5/08* (2013.01); *B05D 5/02* (2013.01); *B32B 3/30* (2013.01); *B32B 27/14* (2013.01);
(Continued)

(58) Field of Classification Search
CPC ............. B05D 5/08; B05D 5/02; B65D 23/02
See application file for complete search history.

(56) References Cited

U.S. PATENT DOCUMENTS

2013/0034695 A1    2/2013  Smith et al.
2013/0251946 A1*   9/2013  Azimi ..................... B05D 5/00
                                                          428/142
(Continued)

FOREIGN PATENT DOCUMENTS

JP   03-503379 A    8/1991
JP   2002-087420 A  3/2002
(Continued)

OTHER PUBLICATIONS

A. Lafuma & D. Quere, Nov. 3, 2011 (Published), A Letters Journal Exploring the Frontiers of Physics (Issue Dec. 2011), EPL96.*
(Continued)

*Primary Examiner* — Nathan L Van Sell
(74) *Attorney, Agent, or Firm* — Sughrue Mion, PLLC

(57) ABSTRACT

A structure forming, on a surface thereof, a rough surface portion 1 having a maximum height of roughness Rz in a range of 0.5 to 5.0 μm, and forming, on the rough surface portion 1, a thin liquid film 3 having a thickness in a range of not less than 0.1 μm but less than 3.4 μm. The structure exhibits a high degree of slipping property despite the liquid film formed on the surface has a very small thickness.

9 Claims, 4 Drawing Sheets

(51) Int. Cl.
   *B32B 27/14*   (2006.01)
   *B32B 27/20*   (2006.01)
   *B32B 3/30*    (2006.01)
   *B32B 33/00*   (2006.01)
   *B65D 23/02*   (2006.01)

(52) U.S. Cl.
   CPC ............ *B32B 27/205* (2013.01); *B32B 33/00* (2013.01); *B65D 23/02* (2013.01); *B32B 2439/70* (2013.01)

(56)              References Cited

U.S. PATENT DOCUMENTS

| 2013/0251952 | A1* | 9/2013  | Smith  | B65D 23/02 |
|              |     |         |        | 428/161    |
| 2013/0333789 | A1* | 12/2013 | Smith  | F16L 58/04 |
|              |     |         |        | 138/145    |
| 2014/0011013 | A1* | 1/2014  | Jin    | B05D 5/08  |
|              |     |         |        | 428/297.4  |
| 2014/0147627 | A1  | 5/2014  | Aizenberg et al. |  |
| 2014/0314975 | A1* | 10/2014 | Smith  | B05C 7/00  |
|              |     |         |        | 428/34.1   |
| 2015/0108032 | A1  | 4/2015  | Akutsu et al. |   |
| 2015/0152270 | A1* | 6/2015  | Aizenberg | A61L 29/085 |
|              |     |         |        | 210/500.27 |
| 2015/0353271 | A1  | 12/2015 | Akutsu et al. |  |
| 2016/0152786 | A1  | 6/2016  | Akutsu et al. |  |

FOREIGN PATENT DOCUMENTS

| JP | 2014-509959 | A  | 4/2014  |
| JP | 2015-042481 | A  | 3/2015  |
| WO | 89/09246    | A1 | 10/1989 |
| WO | 2012/100099 | A2 | 7/2012  |
| WO | 2012/100100 | A2 | 7/2012  |
| WO | 2013/022467 | A2 | 2/2013  |
| WO | 2014/010534 | A1 | 1/2014  |
| WO | 2014/123217 | A1 | 8/2014  |

OTHER PUBLICATIONS

Nancy W Stauffer, "Novel slippery surfaces: Improving steam turbines and ketchup bottles," MIT Energy Initiatives, Jun. 20, 2013, 3 pages.

International Search Report of PCT/JP2015/061451 dated Jul. 21, 2015.

* cited by examiner

STRUCTURE HAVING LIQUID FILM ON THE SURFACE THEREOF

CROSS REFERENCE TO RELATED APPLICATIONS

This application is a National Stage of International Application No. PCT/JP2015/061451 filed Apr. 14, 2015, claiming priority based on Japanese Patent Application No. 2014-091894 filed Apr. 25, 2014, the contents of all of which are incorporated herein by reference in their entirety.

TECHNICAL FIELD

This invention relates to a structure forming a liquid film on the surface thereof.

BACKGROUND ART

Plastic materials are easy to form, can be easily formed into a variety of shapes and have, therefore, been widely used in a variety of applications. Specifically, directly blow-formed bottles of which the inner wall surfaces are formed by using an olefin resin such as low-density polyethylene, have been widely used as containers for containing viscous fluid substances such as ketchup, mayonnaise and the like by utilizing their squeezing properties or squeeze-out properties.

Here, the containers for containing viscous fluid substances must have an inner surface that exhibits highly slipping property for the contents such that the contents can be discharged quickly and completely up to the last drop without remaining in the containers.

So far, the slipping property has been attained by blending a resin that forms the inner surface of the container with an additive such as lubricant. In recent years, however, there have been proposed various kinds of technical arts for improving surface properties such as slipping properties to viscous substances by forming a liquid film on the surface of a resin base material (e.g., see patent documents 1, 2 and 3).

According to the above technical arts, the slipping property can be strikingly improved as compared to the case of adding an additive such as lubricant to the resin that forms the surface of the base material, and attention has now been paid thereto.

Here, according to means for improving surface properties by forming the liquid film on the surface, it becomes necessary to stably hold the liquid film on the surface. To do so, the above patent documents 1 to 3 are all forming fine ruggedness in the surfaces.

Here, though the ruggedness is formed in the surfaces in an attempt to stably maintain the liquid film, no relation has yet been closely studied between the degree of ruggedness and the slipping property of the fluid substance moving on the liquid film.

PRIOR ART DOCUMENTS

Patent Documents

Patent document 1: WO2012/100099
Patent document 2: WO2013/022467
Patent document 3: WO2014/010534

OUTLINE OF THE INVENTION

Problems that the Invention is to Solve

The present inventors have conducted experiments extensively concerning the structures having a liquid film formed on the surfaces, and have previously proposed a structure having portions locally protruded on the surface of the liquid film (JP-A-2014-006083). The inventors have, further, forwarded the study concerning the structure, and have discovered an interesting knowledge in that in case the surface is finely rough to a certain level, then the thickness of the liquid film may be set to be nearly equal to a maximum height of roughness of the rough surface. In this case, the slip-down property is improved to such an extent that could not have been seen when the liquid film of the same thickness was formed on a smooth surface.

That is, the object of the present invention is to provide a structure that exhibits a high degree of slipping property despite the liquid form formed on the surface has a very small thickness.

Means for Solving the Problems

According to the present invention, there is formed a structure forming, on the surface thereof, a rough surface portion having a maximum height of roughness Rz in a range of 0.5 to 5.0 µm, and forming, on the rough surface portion, a thin liquid film having a thickness in a range of not less than 0.1 µm but less than 3.4 µm.

In the structure of the present invention, it is desired that:
(1) The thickness of the liquid film is in a range of 10% to 170% of the maximum height of roughness Rz;
(2) The rough surface portion has a root mean square roughness Rq in a range of 50 to 600 nm;
(3) On the rough surface portion, protuberances of heights of not less than 0.7 µm are observed maintaining a gap of not more than 30 µm on the average;
(4) The rough surface portion is formed by adhering fine particles onto the surface of a plastic material;
(5) The fine particles are silica particles;
(6) The liquid film is formed by using a liquid having a surface tension of 10 to 40 mN/m;
(7) The liquid is a liquid paraffin or an edible oil;
(8) The structure is used as a packing material; and
(9) When the structure on which 6 mg of pure water is placed is inclined at an angle of inclination of 30°, the slip-down velocity thereof is larger than the slip down velocity of when a liquid film of the same thickness is formed on the structure of which the surface has not been roughened.

Effects of the Invention

In the structure of the present invention, the liquid film is formed on the surface and it is made possible to express a variety of surface properties depending on the kind of the liquid that forms the liquid film. For instance, if the liquid film is formed by using a fluorine-contained liquid, a fluorine-contained surfactant or an oily liquid such as silicone oil or plant oil, then it is made possible to greatly improve slipping property or non-adhering property for aqueous substances such as water and the like. If the liquid film is formed by using an oil-repellent liquid, on the other hand, it is made possible to greatly improve slipping property or non-adhering property for the oily substances.

In the invention, further, the liquid film is formed on the portion of finely rough surface having a maximum height of roughness Rz of 0.5 to 5.0 µm and, besides, the liquid film is a very thin film having a thickness in a range of not less than 0.1 µm but less than 3.4 µm.

Namely, despite the liquid film has such a very small thickness, the structure exhibits slip-down property that is so improved as could not have been seen in case the liquid film is formed maintaining the same thickness on the smooth surface as also demonstrated in Examples appearing later. Besides, since the liquid film has such a small thickness, it is allowed to effectively avoid a change in the surface of the liquid film caused by the weight of the liquid forming the liquid film or a change in the thickness caused by the falling. Therefore, the structure exhibits excellent surface properties maintaining stability.

Moreover, since the liquid film is formed by using the liquid in a small amount, a large advantage is also obtained in cost.

By utilizing improved surface properties, the structure of the present invention can be applied to various uses by forming a liquid film using a suitable liquid. Specifically, the structure of the invention can be used as a packing material such as of lids and containers for containing viscous liquids (e.g., ketchup, mayonnaise, dressing, etc.).

MODES FOR CARRYING OUT THE INVENTION

<Surface State of the Structure>

Figure 1:
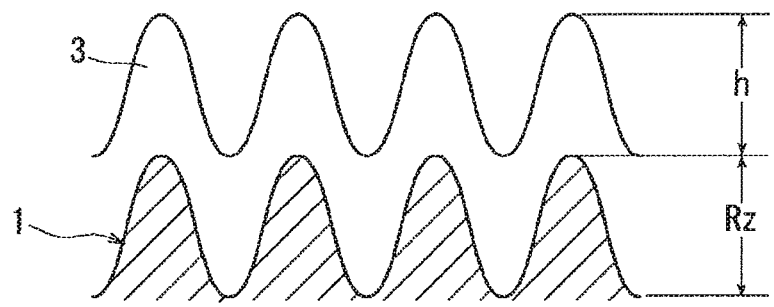
FIG. 1 is a view illustrating the state of a surface which is a major portion of a structure of the present invention.

Referring to FIG. 1, the structure of the present invention has a rough surface portion designated at 1, has a liquid film 3 formed on the rough surface portion 1, and exhibits greatly improved slipping property for the aqueous substances or for the oily substances depending on the kind of the liquid that forms the liquid film 3.

Namely, in the invention, a maximum height of roughness Rz of the rough surface portion 1 is set to lie in a range of 0.5 to 5.0 µm, and the thickness of the liquid film 3 is set to assume a small value in a range of not less than 0.1 µm but less than 3.4 µm. As a result, the liquid film forms ruggedness tracing the rough surface 1 and expresses excellent slipping property for the object that flows on the liquid film 3.

Unlike the waves formed by the movement of a liquid, ruggedness in the surface of the liquid film 3 stays at a predetermined position and can be confirmed by using an interatomic force microscope or a white color interference microscope.

Figure 2:
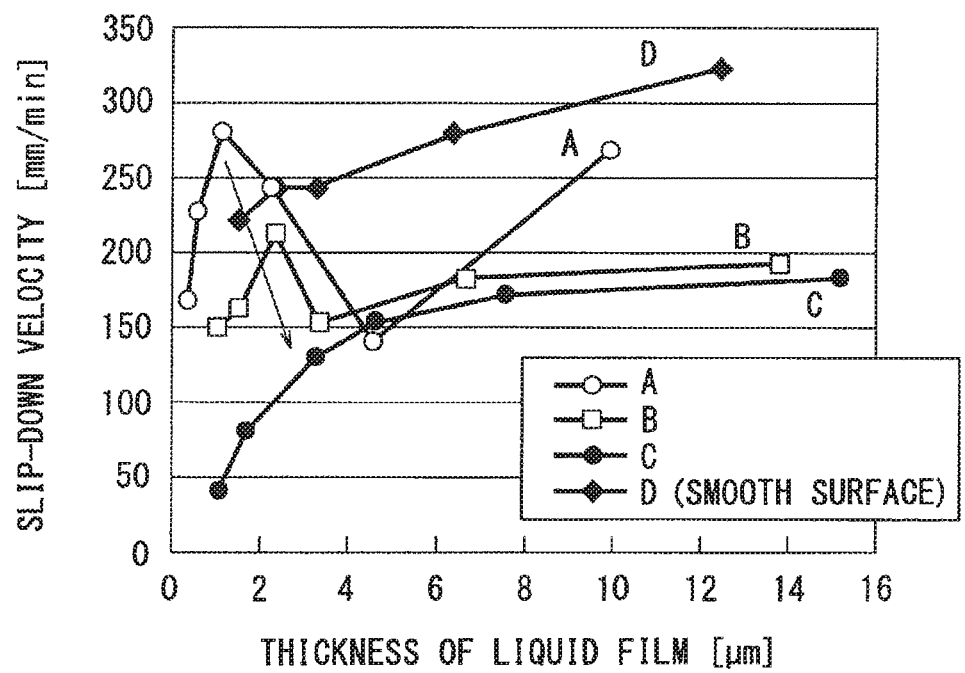
FIG. 2 is a graph illustrating relationships between the thicknesses of the liquid films and the slip-down velocities.

For example, FIG. 2 shows experimental results of Examples appearing later, and is a graph illustrating relationships between the thicknesses and the slip-down velocities of the liquid films formed on a smooth surface and on rough surfaces having various degrees of surface roughness.

Figure 3:
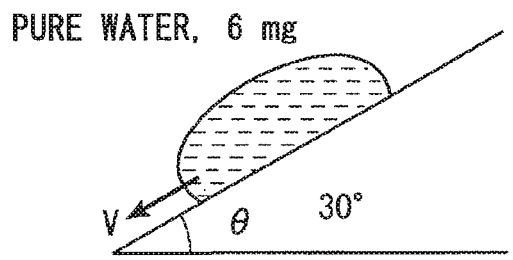
FIG. 3 is a drawing illustrating a method of measuring the slip-down velocity.

In the above experimental results, the slip-down velocity is a velocity of a water droplet (6 mg) of when it is allowed to slip down by its own weight along the surface that is holding the liquid film 3 of a medium-chain fatty acid triglyceride (MCT) and that is set at an angle of inclination θ of 30 degrees as shown in FIG. 3 (for detailed conditions, refer to Examples). The larger the velocity, the higher the slipping property for water.

The thickness of the liquid film can be found from a change in the weight of the structure of before and after the liquid film is formed.

In FIG. 2, a curve A represents a relationship between the slip-down velocity and the thickness of the liquid film on a rough surface A formed by roughening the surface of a plastic film of which the surface is formed by using a polypropylene, a curve B represents a relationship between the slip-down velocity and the thickness of the liquid film on a rough surface B formed by the roughening treatment, a curve C represents a relationship between the slip-down velocity and the thickness of the liquid film on a rough surface C formed by the roughening treatment, and a curve D represents a relationship between the slip-down velocity and the thickness of the liquid film on a smooth surface D of the underlying polypropylene film.

Tabulated below are maximum heights of roughness Rz and root mean square roughness Rq on the surfaces A to D.

|  | Rq (nm) | Rz (µm) |
| --- | --- | --- |
| Rough surface A | 134 | 1.3 |
| Rough surface B | 475 | 2.5 |
| Rough surface C | 717 | 5.2 |
| Smooth surface D | 34 | 0.2 |

When the liquid films are formed on the rough surfaces A and B of which Rz are within the predetermined range in accordance with the present invention as will be understood from FIG. 2, maximum peak values in the slip-down velocities are exhibited on the portions where the thickness of the liquid film is close to Rz, i.e., improvements in the slip-down property that are not exhibited when the liquid film of the same thickness is formed on the smooth surface. On the rough surface A, further, the maximum peak value in the slip-down velocity is higher than that of when the liquid film of the same thickness is formed on the smooth surface D, i.e., a higher slip-down property is realized. Further, the maximum peak value extinguishes when the liquid film is formed on the rough surface C where Rz is rougher than the range specified by the present invention.

According to the present invention as described above, excellent slip-down property can be expressed by forming a very thin liquid film 3 of which the thickness is close to the value Rz on the rough surface of which Rz lies in a very small range.

The present inventors have not yet clarified the reason why high slip-down property is achieved by setting the maximum height of roughness Rz and the thickness of the liquid film as described above, but presume it as described below.

Namely, it is a general idea that a liquid substance slipping down on the liquid film formed on a predetermined surface is in a state of liquid-liquid contact, and its slip-down velocity is larger than a velocity of when the liquid substance flows down on a solid surface. Therefore, the slip-down velocity can be explained relying on the Couette flow.

Figure 4:
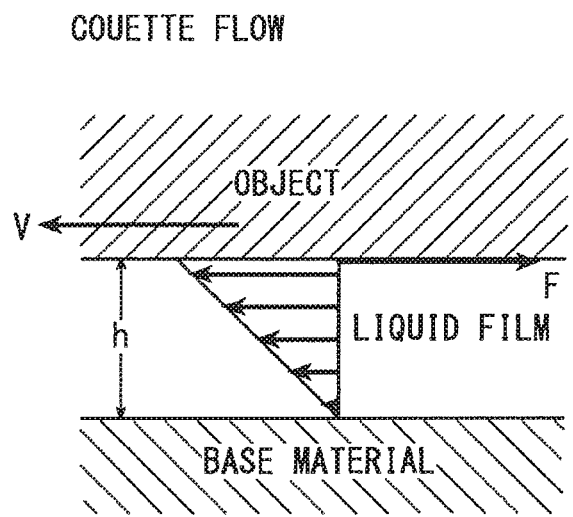
FIG. 4 is a view illustrating the principle of the Couette flow.

In the Couette flow as shown in FIG. 4, the velocity V of an object flowing on a liquid film formed on the surface of a predetermined base material is dominated by the liquid film and the frictional force F which is expressed by the following formula (1), $$F=\eta VA/h \quad (1)$$

wherein,

η is a viscosity of the liquid film,

A is a contact area, and h is a thickness of the liquid film.

On the other hand, when a liquid droplet (object) slips down along a tilted surface of an angle of inclination θ shown in FIG. 3, the frictional force F is expressed by the following formula (2), $$F=mg \sin \theta \quad (2)$$

wherein, m is a mass of the liquid droplet, g is the gravitational acceleration, and θ is an angle of inclination.

In this case, therefore, the slip-down velocity V is expressed by the following formula (3), $$V=mg \sin \theta \cdot g/\eta A \quad (3)$$

That is, as will be understood from the formula (3) the slip-down velocity V varies in proportion to the thickness of the liquid film.

Figure 5:
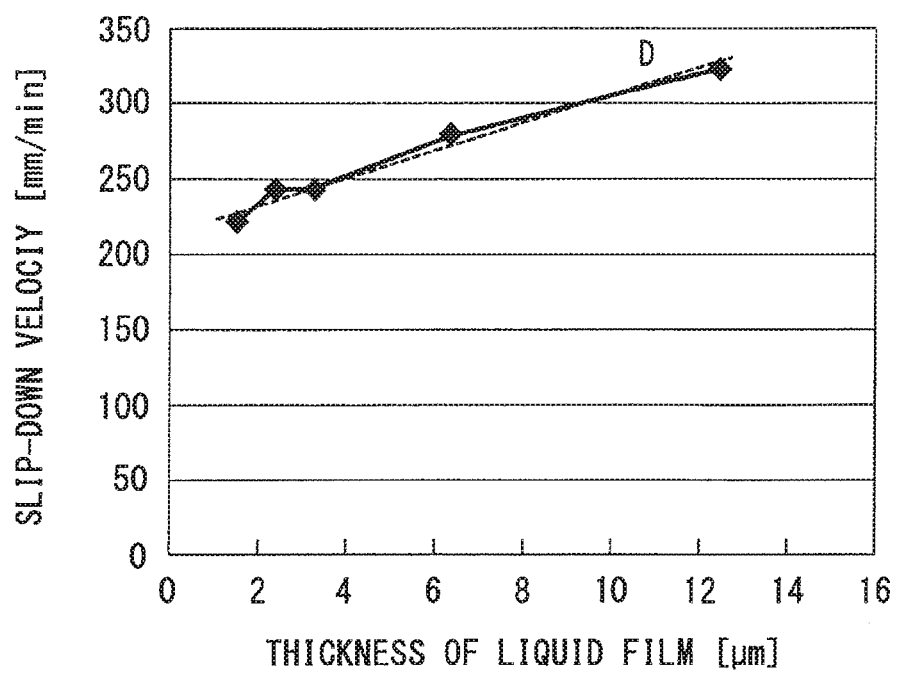
FIG. 5 is a graph depicting a diagram D that shows a relationship between the thickness h of the liquid film and the slip-down velocity V on a smooth surface D in FIG. 2.

Referring, therefore, to FIG. 5 showing a curve D of FIG. 2, when the liquid film is formed on the smooth surface D, the slip-down velocity on the surface of the liquid film varies in proportion to the thickness h of the liquid film and complies with the Couette flow.

However, when the liquid films are formed on the rough surfaces A and B of which the maximum heights of roughness Rz are within the predetermined range as contemplated by the present invention, there is seen an improvement in the slip-down property that could not be seen when the liquid of the same thickness was formed on the smooth surface D. This is presumably due to that the roughness of the rough surface is reflected on the surface of the liquid film.

Figure 6:
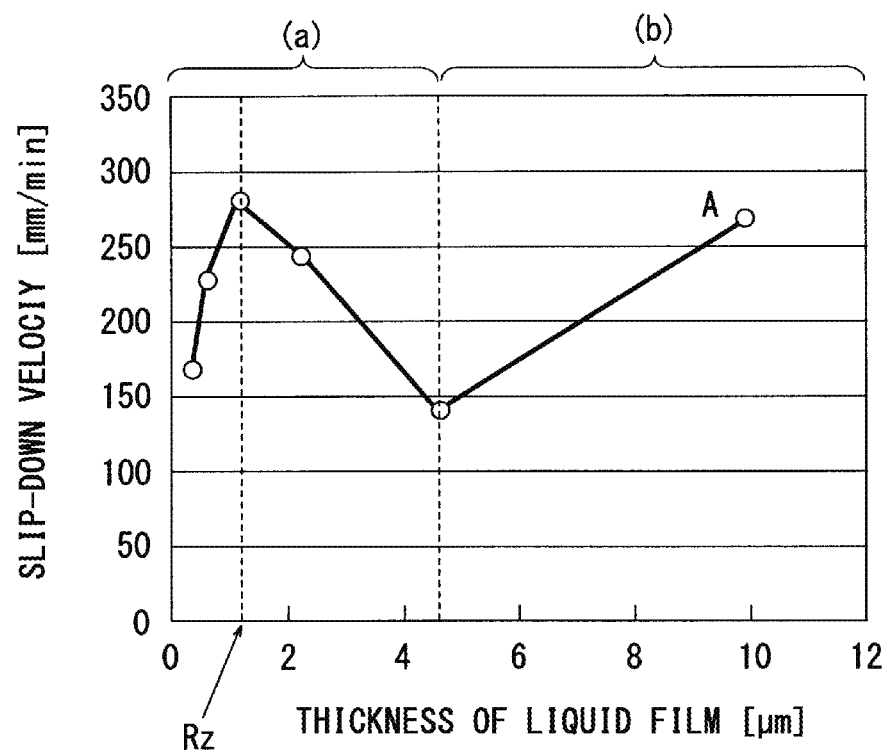
FIG. 6 is a graph depicting a diagram A that shows a relationship between the thickness h of the liquid film and the slip-down velocity V on a rough surface A in FIG. 2.
Figure 7A:
FIGS. 7A and 7B are views illustrating the states of the surface of the liquid film.
Figure 7B:

For instance, in a region (FIG. 6(b)) where the liquid film has a large thickness, the surface of the liquid film is smooth as shown in FIG. 7B, and the slip-down velocity complies with the Couette flow. As the thickness of the liquid film becomes small, however, roughness of the rough surface is reflected on the surface of the liquid film and it is presumed that ruggedness is formed in the surface of the liquid film as shown in FIG. 7A. In a region where the liquid film has a small thickness, therefore, there is exhibited a behavior different from the Couette flow.

Figure 8:
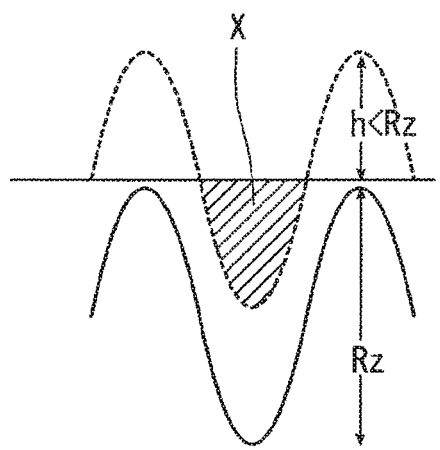
FIG. 8 is a view illustrating the state of a liquid film 3 of when the thickness h of the liquid film is not more than the maximum height of roughness Rz.

In a region (FIG. 6(a)) where a rugged shape is reflected in the surface of the liquid film, there exists a maximum peak value which is in agreement with the maximum height of roughness Rz. That is, when the thickness h of the liquid film is smaller than the maximum height of roughness Rz, there exists, as shown in FIG. 8, a recessed portion X where the thickness h of the liquid film is smaller than the maximum height of roughness Rz of the rough surface. Namely, the effect of ruggedness in the rugged surface so increases as to serve as resistance against the slipping. The smaller the thickness h of the liquid film, the larger the resistance. It is, therefore, presumed that the slip-down velocity decreases with a decrease in the thickness h of the liquid film.

Therefore, when the liquid films are formed on the rough surfaces A and B having predetermined degrees of surface roughness, a maximum peak value is exhibited in the slip-down velocity in a portion where the thickness h of the liquid film becomes equal to the maximum height of roughness Rz. In the vicinities of this portion, too, there is seen an improvement in the slip-down property that was not seen when the liquid film of the same thickness was formed on the smooth surface D. Moreover, when the liquid film is formed on the rough surface A, the slip-down velocity becomes greater than that of when the liquid film is formed on the smooth surface D.

Here, on a rough surface B (curve B) where the maximum height of roughness Rz is larger than that of the rough surface A, as shown in FIG. 2, a maximum peak value in the liquid film is shifting toward the side in which the thickness h increases. That is, on the rough surface B, Rz is larger than that on the rough surface A. Therefore, the liquid film must have an increased thickness h for filling the recessed portion X in FIG. 8 and, hence, the thickness h filling the recessed portion X exhibits a maximum peak value at the portion of Rz. Namely, on the rough surface B, Rz is larger than that on the rough surface A, and the position of the maximum peak value is shifting toward the side of larger thickness h.

On the rough surface B, further, the maximum height of roughness Rz is so large that the surface of the liquid film cannot easily trace the rough surface B. If the thickness of the liquid film becomes large than a predetermined value, therefore, the protruded portions of the liquid film are flattened due to their own weights resulting, therefore, in a decrease in the slip-down velocity. That is, on the rough surface B, a maximum peak value in the slip-down velocity becomes smaller than that on the rough surface A.

On the rough surface C (curve C) having a maximum height of roughness Rz larger than that of not only the rough surface A but also of the rough surface B, on the other hand, the surface of the liquid film less traces the rough surface C, and the protruded portions of the liquid film are more flattened. On the rough surface C, therefore, the slip-down velocity decreases more due to the flattened surface of the liquid film. That is, on the rough surface C, a maximum peak value in the slip-down velocity is extinguished and, therefore, the slip-down property is not improved. This means that in order to improve the slip-down property as compared to when the liquid film of the same thickness is formed on the smooth surface D, the maximum height of roughness Rz of the rough surface on which the liquid film is formed must lie in a region smaller than a predetermined range.

According to the present invention as shown in FIG. 1, therefore, a maximum height of roughness Rz of the surface (rough surface) which serves as the underlying layer of the liquid film 3 is set to lie in a predetermined range (0.5 to 5.0 μm) and the thickness h of the liquid film 3 is set to lie in a range of not less than 0.1 μm but less than 3.4 μm. Despite the liquid film 3 has a very small thickness, therefore, it is allowed to realize a higher slip-down property than that of when the liquid film of the same thickness is formed on the smooth surface C.

In the invention, further, it is desired that the rough surface for holding the liquid film 3 has a root mean square roughness Rq in a range of 50 to 600 nm from the standpoint of stably maintaining the slip-down velocity by the liquid film 3. This is because the slip-down velocity greatly disperses if the maximum height of roughness Rz only locally lies in the predetermined range.

It is, further, desired that the rough surface holding the liquid film 3 has protuberances of a height of not less than 0.7 µm (i.e., has a maximum height of roughness Rz of not less than 0.7 µm) and, specifically, that the protuberances of such a height are present maintaining a gap of not more than 30 µm on the average from the standpoint of further improving the slip-down property. In such a case, ruggedness possessed by the rough surface is clearly reflected in the surface of the liquid film 3.

<Forming the Surface Structure>

In the present invention, the above-mentioned surface structure can be formed in the surface of any material so far as it is capable of forming a rough surface having a predetermined maximum height of roughness Rz as described above. Namely, the surface structure can be formed in, for example, a resin surface, a metal surface or a glass surface. From the standpoint of easiness in forming the rough surface, however, it is desired that the surface structure is formed in the resin surface.

That is, to obtain the above-mentioned maximum height of roughness Rz by roughening the metal surface or the glass surface, the method is limited to the etching or the blast treatment by using a fine projection material (medium) such as alundum or white alundum involving difficulty for obtaining the maximum roughness as desired. In the case of the resin surface, however, the rough surface having a predetermined maximum height of roughness Rz can be reliably formed by blast-treating the surface of the mold or by etching the surface of the mold and transferring it onto the resin surface, or by applying a treating solution obtained by dispersing a predetermined surface-roughening agent (fine particles) in a suitable solvent onto the resin surface by spray coating or dipping, or by using a spin-coater, a bar coater, a roll coater or a gravure coater and the like, followed by drying, or by adding an additive having bleeding property to the resin that forms the surface. Thus in the case of the resin surface, there can be employed various surface-roughing means depending on the use.

As the surface-roughening agent externally added to the resin surface that is to be roughened, there can be used fine particles having a mean secondary particle size (mean primary particle size on the volume basis as measured by the laser diffraction light scattering method) of not more than 4 µm, such as metal oxide particles like that of titanium oxide, alumina and silica; carbonate such as calcium carbonate; fine carbon particles such as carbon black; and organic particles comprising poly(methyl (meth)acrylate), polyethylene and silicone particles as represented by polyorganosilsesguioxane, which may be treated with a silane coupling agent or a silicone oil so as to be hydrophobic. Namely, if there are used coarse particles having a mean particle size of larger than the above-mentioned range, then the rough surface acquires a maxim height of roughness Rz which is larger than a desired range and it becomes difficult to form the liquid film 3 that exhibits the above-mentioned singular behavior.

As described above, further, if there are used fine particles that are treated to be hydrophobic, the oily liquid film 3 can be stably formed. If there are used fine particles that are not treated to be hydrophobic, on the other hand, the aqueous liquid film 3 can be favorably formed.

Further, when the surface-roughening agent is to be internally added to the resin that forms the surface, there can be used, as an additive, the same fine particles as those described above. Usually, in the case of a coating material though dependent on the kind of the resin that forms the surface, the additive is used in an amount of 0.1 to 100 parts by mass and, specifically, 0.1 to BO parts by mass per 100 parts by mass of the resin. In the case of a resin composition, the additive is used in an amount of 0.1 to 50 parts by mass and, specifically, 0.1 to 30 parts by mass per 100 parts by mass of the resin from the standpoint of reliably forming the rough surface having the above-mentioned maximum height of roughness Rz without impairing the formability of the resin.

Means for externally adding the fine granular surface-roughing agent to the resin and means for internally adding the fine granular surface-roughing agent to the resin surface have their advantages and disadvantages, and may be selectively used depending on the properties required for the surface. For example, by using the means for externally adding the surface-roughening agent, it is allowed to reliably prevent the liquid forming the liquid film 3 from infiltrating into the resin and, therefore, the thickness of the liquid film 3 can be stably maintained for extended periods of time often causing, however, such a trouble that the rough surface portion (layer of fine particles) on which the liquid film 3 is formed is likely to be removed due to physical external force. By using the means for internally adding the surface-roughening agent, on the other hand, it is made possible to effectively avoid such an inconvenience as removal of the rough surface portion that holds the liquid film 3 accompanied, however, by such an occurrence that the liquid forming the liquid film 3 easily infiltrates into the underlying resin and the thickness of the liquid film 3 decreases with the passage of time. Therefore, either the means of external addition or the means of internal addition has advantage and disadvantage. It is, therefore, recommended that either means is employed by taking into consideration the requirements depending on the use.

Further, any liquid can be used for forming the liquid film 3 on the rough surface 1 depending on the surface properties that are to be imparted to the surface of the resin structure (resin formed body 1). The liquid, as a matter of course, must be a nonvolatile liquid having a small vapor pressure under atmospheric pressure, such as a high-boiling liquid having a boiling point of not lower than 200° C. This is because if the volatile liquid is used, the liquid easily volatilizes and extinguishes with the passage of time making it difficult to form the liquid film 3.

There can be concretely exemplified various kinds of liquids provided they are high-boiling liquids as described above. Specifically, the liquid exhibits a high lubricating effect if it has a surface tension greatly different from that of the substance that is to slip down, and is suited for the present invention.

It is desired to use a liquid having a surface tension lying in a range of, for example, 10 to 4.0 mN/m and specifically, 16 to 35 mN/m. Representative examples are liquid paraffin, fluorine-contained liquid, fluorine-contained surfactant, silicone oil, fatty acid triglyceride and various plant oils. As the plant oils, there can be preferably used soy bean oil, rape oil, olive oil, rice oil, corn oil, safflower oil, sesame oil, palm oil, castor oil, avocado oil, coconut oil, almond oil, walnut oil, hazel oil and salad oil.

Further, any resin can be used without limitation for forming the resin surface provided it can be formed into a shape that meets the use of the structure. From the standpoint of being suited for use as a packing material such as container or cap, however, it is desired to use thermoplastic resins, e.g., olefin resins such as low-density polyethylene, linear low-density polyethylene, medium- or high-density polyethylene, polypropylene, poly(1-butene) and poly(4-methyl-1-pentene); copolymerized resins of these olefins; and polyester resins such as poly(ethylene terephthalate), poly(ethylene naphthalate) and poly(ethylene terephthalate/ isophthalate). Specifically, when the structure is used as a squeeze container for squeezing out the content, it is desired to use the olefin resin such as low-density polyethylene or linear low-density polyethylene.

<Form of the Structure>

The structure of the invention having the above-mentioned surface structure can be used by itself. Usually, however, it is used as a multilayer structure on which layers of other materials are laminated yet maintaining the above surface structure. For instance, on the lower side of a surface layer of resin having a rough underlying surface for supporting the liquid film 3, there can be laminated with a metal foil, a glass, paper or any other resin layer depending on the form thereof. In fabricating, such a laminated layer structure, there can be used a suitable adhesive to increase adhesive strength to the metal foil or to the other resin layer.

As the metal foil, for example, an aluminum foil is usually used. The embodiment using the aluminum is suited for forming, specifically, pouches.

When the glass layer is laminated, further, the embodiment is suited for the use of, specifically, preventing the adhesion of water film, such as preventing the glass from being fogged.

When the other resin layer is laminated, further, the embodiment is suited for being used as container's such as bottles, cups, etc. The other resin layer will, representatively, bee layer of a gas barrier resin such as of ethylene-vinyl alcohol copolymer, an oxygen-absorbing layer containing a polymer to be oxidized and a transition metal catalyst, or a reground resin layer containing scraps such as burr generated at the time of forming, the layer being used, specifically, as an intermediate layer.

In the multilayer structure, the inner surface layer (resin surface layer) and the outer surface layer can be formed by using different resins. For instance, the inner surface can be formed by using an olefin resin such as low-density polyethylene and the outer surface can be formed by using a polyester resin such as PET.

The structure of the single layer or the multilayer, depending on its form, can be formed by a known forming method such as film-forming method like casting method, T-die method, calender method or inflation method, or by known means such as sandwich lamination, co-extrusion forming, co-injection forming, compression forming or vacuum forming. For instance, a container is formed by forming a preform in the form of a sheet, a pipe or a test tube and, thereafter, subjecting the preform to the secondary forming such as blow forming or plug-assist forming.

The above-mentioned structure of the present invention is capable of exhibiting surface properties of the liquid film 3 to a sufficient degree and is used, most desirably, as a container for containing, specifically, viscous contents such as ketchup, aqueous paste, honey, various kinds of sauces, mayonnaise, mustard, dressing, jam, chocolate syrup, yogurt, cosmetic such as milky lotion, liquid, detergent, shampoo and rinse. Namely, the liquid film 3 is formed by using a suitable liquid depending on the kind of the content. Upon inclining or inverting the container, the content is permitted to be quickly discharged without adhering on the inner wall of the container.

For instance, ketchup, various sauces, honey, mayonnaise, mustard, jam, chocolate syrup, yogurt, milky lotion and the like are hydrophilic substances containing water. As a liquid for forming the liquid film 3, therefore, there can be preferably used oily liquids that have been approved as foodstuff additives, such as silicone oil, fatty acid glyceride and edible oil.

EXAMPLES

The invention will now be described by way of the following Examples.

Described below are a variety of properties, methods of measuring properties and resins used for forming the structures in Examples described below.

1. Measuring the Shapes of the Rough Surfaces.

Rough surfaces formed on the films by the method described below were measured prior to being applied with the lubricating liquid by using an interatomic force microscope (NanoScope III, manufactured by Digital Instruments). The measuring conditions were as described below.

Cantilever: resonance frequency $f_0$=363 to 392 kHz, spring constant k=20 to 80 N/m Measuring mode: tapping mode Scanning rate: 0.250 Hz Scanning range: 10 μm×10 μm Number of scanning lines: 256

By using a software (Nanoscope: version 5.30 r2) attached to the interatomic force microscope, a root mean square roughness Rq and a maximum height of roughness Rz were found from the obtained data of the three-dimensional shape. The root mean square roughness Rq is given by the following formula, $$Rq = \sqrt{\frac{i}{n}\sum_{1}^{n}(Z(i) - Z_{ave})^2}$$

wherein n is a numbers of data points, Z(i) is a value of Z at a square data point, and Zave is a mean value of all Z values.

The maximum height of roughness Rz is a difference between a maximum value of all data points Z(i) and a minimum value thereof. Further, measurements were taken over scanning range of 50 μm×50 μm under the above-mentioned measuring conditions.

From the obtained data of the three-dimensional shape, there were found the number of protuberances having a height of not less than 0.7 μm within a range of 10 μm×10 μm and a mean gap among the protuberances.

2. Measuring the Slip-Down Velocity.

A test piece measuring 30 mm×150 mm was cut out from a film obtained by the method described later, and was stuck to a fixing jig in a manner that the surface to be measured (surface having a liquid film formed on thereon) was facing upward. At room temperature (20 to 25° C.), the jig was inclined at an angle of inclination of 30°, a scale was installed at the back thereof, 6 mg of pure water was placed on the surface to be measured, and images were photographed for every 5 seconds. The distance of movement was measured from the obtained images, and a velocity calculated to becoming constant was regarded to be the slip-down velocity. The larger the value of the slip-down velocity, the more excellently the content is slipping down.

Described below are the hydrophobic silica used for forming the rough surfaces A, B and C.

Forming the rough surface A.

Hydrophobic silica A (dry hydrophobic silica, mean secondary particle size, <1 μm)

Forming the rough surface B.
  Hydrophobic silica B (wet hydrophobic silica, mean secondary particle size, 2.8 μm)
Forming the rough surface C.
  Hydrophobic silica C (wet hydrophobic silica, mean secondary particle size, 8.3 μm)
The liquid film was formed by using the following lubricating liquid.
Medium-chain fatty acid triglyceride (MCT)
  Surface tension: 28.8 mN/m
  Viscosity (25° C.): 33.8 mPa·s Example 1

0.5 Grams of the hydrophobic silica A and 9.5 g of ethanol were weighed and put into a vial, and were stirred therein for 30 minutes by using a stirrer. The obtained coating material was applied by using a bar coater (#6) onto the polypropylene surface of the polypropylene multilayer film and was dried at room temperature to obtain a film forming the rough surface A (hereinafter polypropylene is often abbreviated as PP).

A piece was cut in a size of 150 mm×150 mm from the above film, and was attached onto a rotary plate of a spin coater in a manner that the rough surface A faced upward. Next, the MCT was applied as the lubricating liquid by using the spin coater (5000 rpm, 60 sec.).

The amount of MCT applied was calculated from a change in the weight of the film before and after the MCT was applied. The amount of oil adsorbed by the hydrophobic silica A was subtracted therefrom to find the thickness of the liquid film. Further, the film was measured for its surface shape and slip-down velocity. The ratio of the measured thickness of the liquid film to the maximum height of roughness Rz was then calculated. The results were as shown in Table 1.

Example 2

A film having an MCT film formed thereon was prepared in the same manner as in Example 1 but changing the application condition by the spin coater into 3500 rpm×60 sec., and was measured for its surface shape and the slip-down velocity. The ratio of the measured thickness of the liquid film to the maximum height of roughness Rz was then calculated. The results were as shown in Table 1.

Example 3

A film having an MCT film formed thereon was prepared in the same manner as in Example 1 but changing the application condition by the spin coater into 3000 rpm×60 sec., and was measured for its surface shape and the slip-down velocity. The ratio of the measured thickness of the liquid film to the maximum height of roughness Rz was then calculated. The results were as shown in Table 1.

Example 4

A film having an MCT film formed thereon was prepared in the same manner as in Example 1 but changing the application condition by the spin coater into 2500 rpm×60 sec., and was measured for its surface shape and the slip-down velocity. The ratio of the measured thickness of the liquid film to the maximum height of roughness Rz was then calculated. The results were as shown in Table 1.

Example 5

A film was prepared in the same manner as in Example 1 but using the hydrophobic silica B instead of the hydrophobic silica A, and was measured for its surface shape and the slip-down velocity. The ratio of the measured thickness of the liquid film to the maximum height of roughness Rz was then calculated. The results were as shown in Table 1.

Example 6

A film was prepared in the same manner as in Example 2 but using the hydrophobic silica B instead of the hydrophobic silica A, and was measured for its surface shape and the slip-down velocity. The ratio of the measured thickness of the liquid film to the maximum height of roughness Rz was then calculated. The results were as shown in Table 1.

Example 7

A film was prepared in the same manner as in Example 3 but using the hydrophobic silica B instead of the hydrophobic silica A, and was measured for its surface shape and the slip-down velocity. The ratio of the measured thickness of the liquid film to the maximum height of roughness Rz was then calculated. The results were as shown in Table 1.

Comparative Example 1

A film having an MCT film formed thereon was prepared in the same manner as in Example 1 but changing the application condition by the spin coater into 1000 rpm×60 sec., and was measured for its surface shape and the slip-down velocity. The ratio of the measured thickness of the liquid film to the maximum height of roughness Rz was then calculated. The results were as shown in Table 1.

Comparative Example 2

A film having: an MCT film formed thereon was prepared in the same manner as in Example 1 but changing the application condition by the spin coater into 500 rpm×60 sec., and was measured for its surface shape and the slip-down velocity. The ratio of the measured thickness of the liquid film to the maximum height of roughness Rz was then calculated. The results were as shown in Table 1.

Comparative Example 3

A film was prepared in the same manner as in Example 4 but using the hydrophobic silica B instead of the hydrophobic silica A, and was measured for its surface shape and the slip-down velocity. The ratio of the measured thickness of the liquid film to the maximum height of roughness Rz was then calculated. The results were as shown in Table 1.

Comparative Example 4

A film was prepared in the same manner as in Comparative Example 1 but using the hydrophobic silica B instead of the hydrophobic silica A, and was measured for its surface shape and the slip-down velocity. The ratio of the measured thickness of the liquid film to the maximum height of roughness Rz was then calculated. The results were as shown in Table 1.

Comparative Example 5

A film was prepared in the same manner as in Comparative Example 2 but using the hydrophobic silica B instead of the hydrophobic silica A, and was measured for its surface shape and the slip-down velocity. The ratio of the measured thickness of the liquid film to the maximum height of roughness Rz was then calculated. The results were as shown in Table 1.

Comparative Example 6

A film was prepared in the same manner as in Example 1 but using the hydrophobic silica C instead of the hydrophobic silica A, and was measured for its surface shape and the slip-down velocity. The ratio of the measured thickness of the liquid film to the maximum height of roughness Rz was then calculated. The results were as shown in Table 1.

Comparative Example 7

A film was prepared in the same manner as in Example 2 but using the hydrophobic silica C instead of the hydrophobic silica A, and was measured for its surface shape and the slip-down velocity. The ratio of the measured thickness of the liquid film to the maximum height of roughness Rz was then calculated. The results were as shown in Table 1.

Comparative Example 8

A film was prepared in the same manner as in Example 3 but using the hydrophobic silica C instead of the hydrophobic silica A, and was measured for its surface shape and the slip-down velocity. The ratio of the measured thickness of the liquid film to the maximum height of roughness Rz was then calculated. The results were as shown in Table 1.

Comparative Example 9

A film was prepared in the same manner as in Example 4 but using the hydrophobic silica C instead of the hydrophobic silica A, and was measured for its surface shape and the slip-down velocity. The ratio of the measured thickness of the liquid film to the maximum height of roughness Rz was then calculated. The results were as shown in Table 1.

Comparative Example 10

A film was prepared in the same manner as in Comparative Example 1 but using the hydrophobic silica C instead of the hydrophobic silica A, and was measured for its surface shape and the slip-down velocity. The ratio of the measured thickness of the liquid film to the maximum height of roughness Rz was then calculated. The results were as shown in Table 1.

Comparative Example 11

A film was prepared in the same manner as in Comparative Example 2 but using the hydrophobic silica C instead of the hydrophobic silica A, and was measured for its surface shape and the slip-down velocity. The ratio of the measured thickness of the liquid film to the maximum height of roughness Rz was then calculated. The results were as shown in Table 1.

Comparative Example 12

No hydrophobic silica was used. By using the spin coater (5000 rpm, 60 sec.), the MCT was directly applied to the PP type multilayered film on the side of the PP surface. A thickness of the MCT liquid film was found from a change in the weight of the film before and after the application of MCT. Further, a film that was prepared was measured for its surface shape and the slip-down velocity. The ratio of the measured thickness of the liquid film to the maximum height of roughness Rz was then calculated. The results were as shown in Table 1.

Comparative Example 13

A film having an MCT film formed thereon was prepared in the same manner as in Example 12 but changing the application condition by the spin coater into 3000 rpm×60 sec., and was measured for its surface shape and the slip-down velocity. The ratio of the measured thickness of the liquid film to the maximum height of roughness Rz was then calculated. The results were as shown in Table 1.

Comparative Example 14

A film having an MCT film formed thereon was prepared in the same manner as in Example 12 but changing the application condition by the spin coater into 2000 rpm×60 sec., and was measured for its surface shape and the slip-down velocity. The ratio of the measured thickness of the liquid film to the maximum height of roughness Rz was then calculated. The results were as shown in Table 1.

Comparative Example 15

A film having an MCT film formed thereon was prepared in the same manner as in Example 12 but changing the application condition by the spin coater into 1000 rpm×60 sec., and was measured for its surface shape and the slip-down velocity. The ratio of the measured thickness of the liquid film to the maximum height of roughness Rz was then calculated. The results were as shown in Table 1.

Comparative Example 16

A film having an MCT film formed thereon was prepared in the same manner as in Example 1 but changing the application condition by the spin coater into 500 rpm×60 sec., and was measured for its surface shape and the slip-down velocity. The ratio of the measured thickness of the liquid film to the maximum height of roughness Rz was then calculated. The results were as shown in Table 1.

Here, Table 1 uses the following abbreviations.
Ex: Example
Com: Comparative Example
P number: number of protuberances
P gap: mean gap among the protuberances

TABLE 1

| | | Evaluation of film | | | | | | |
|---|---|---|---|---|---|---|---|---|
| | | Roughness of surface | | | | Thickness of | | Slip-down property |
| | Surface | Rz [μm] | Rq [nm] | P number [per 2500 μm²] | P gap [μm] | liquid film [μm] | h/Rz [%] | Slip-down velocity [mm/min] |
| Ex. 1 | A | 1.3 | 134 | 9 | 19.8 | 0.3 | 23 | 168 |
| Ex. 2 | ↑ | ↑ | ↑ | ↑ | ↑ | 0.5 | 38 | 228 |
| Ex. 3 | ↑ | ↑ | ↑ | ↑ | ↑ | 1.1 | 85 | 282 |
| Ex. 4 | ↑ | ↑ | ↑ | ↑ | ↑ | 2.2 | 169 | 244 |
| Ex. 5 | B | 2.5 | 475 | 60 | 6.4 | 1.0 | 40 | 150 |
| Ex. 6 | ↑ | ↑ | ↑ | ↑ | ↑ | 1.5 | 60 | 163 |
| Ex. 7 | ↑ | ↑ | ↑ | ↑ | ↑ | 2.3 | 92 | 214 |
| Comp. 1 | A | 1.3 | 134 | 9 | 19.8 | 4.5 | 346 | 141 |
| Comp. 2 | ↑ | ↑ | ↑ | ↑ | ↑ | 9.9 | 762 | 272 |
| Comp. 3 | B | 2.5 | 475 | 60 | 6.4 | 3.4 | 136 | 154 |
| Comp. 4 | ↑ | ↑ | ↑ | ↑ | ↑ | 6.6 | 264 | 184 |
| Comp. 5 | ↑ | ↑ | ↑ | ↑ | ↑ | 13.7 | 548 | 196 |
| Comp. 6 | C | 5.2 | 717 | 342 | 2.7 | 1.1 | 21 | 40 |
| Comp. 7 | ↑ | ↑ | ↑ | ↑ | ↑ | 1.7 | 33 | 82 |
| Comp. 8 | ↑ | ↑ | ↑ | ↑ | ↑ | 3.3 | 63 | 129 |
| Comp. 9 | ↑ | ↑ | ↑ | ↑ | ↑ | 4.5 | 87 | 156 |
| Comp. 10 | ↑ | ↑ | ↑ | ↑ | ↑ | 7.5 | 144 | 174 |
| Comp. 11 | ↑ | ↑ | ↑ | ↑ | ↑ | 15.0 | 288 | 188 |
| Comp. 12 | D | 0.2 | 34 | 0 | — | 1.5 | 750 | 222 |
| Comp. 13 | ↑ | ↑ | ↑ | ↑ | ↑ | 2.2 | 1100 | 246 |
| Comp. 14 | ↑ | ↑ | ↑ | ↑ | ↑ | 3.3 | 1650 | 246 |
| Comp. 15 | ↑ | ↑ | ↑ | ↑ | ↑ | 6.3 | 3150 | 282 |
| Comp. 16 | ↑ | ↑ | ↑ | ↑ | ↑ | 12.3 | 6150 | 324 |

FIG. 2 is a graph illustrating relationships between the measured thicknesses of the liquid films and the slip-down velocities. When the liquid films are formed on the rough surfaces A and B having maximum heights of roughness Rz in the range of 0.5 to 5.0 μm, maximum peaks in the slip-down velocity are exhibited if the thicknesses of the liquid films lie in a range of not less than 0.1 μm but less than 3.4 μm, from which it is learned that the lip-down property is improved as compared to when the liquid film of the same thickness is formed on the smooth surface.

On the rough surfaces A and B, further, maximum peaks are seen in the slip-down velocities. In case the liquid film is formed on the rough surface C having Rz that is more than 5.0 μm, however, it is learned that a maximum peak is extinguishing' in the slip-down velocity.

From the above results, therefore, it is learned that upon roughening the surface to a certain degree, a high level of slipping property is obtained despite the liquid film has a very small thickness.

DESCRIPTION OF THE DRAWINGS

1: surface of the structure (rough surface portion)
3: liquid film
h: thickness of the liquid film

The invention claimed is:

1. A structure forming, on a surface thereof, a rough surface portion having a maximum height of roughness Rz in a range of 0.5 to 5.0 μm, and forming, on the rough surface portion, a liquid film having a thickness in a range of not less than 0.1 μm but less than 3.4 μm, wherein a continuous ruggedness that reflects a ruggedness of the rough surface portion is formed on a surface of the liquid film opposite the rough surface portion, and the thickness of the liquid film is in a range of 10% to 100% of the maximum height of roughness Rz of the rough surface portion under the condition that the thickness of the liquid film is in a range of not less than 0.1 μm but less than 3.4 μm.

2. The structure according to claim 1, wherein the rough surface portion has a root mean square roughness Rq in a range of 50 to 600 nm.

3. The structure according to claim 1, wherein on the rough surface portion, protuberances of heights of not less than 0.7 μm are observed maintaining a gap of not more than 30 μm on the average.

4. The structure according to claim 1, wherein the rough surface portion is formed by adhering fine particles onto the surface of a plastic material.

5. The structure according to claim 4, wherein the fine particles are silica particles.

6. The structure according to claim 1, wherein the liquid film is formed by using a liquid having a surface tension of 10 to 40 mN/m.

7. The structure according to claim 6, wherein the liquid is a liquid paraffin or an edible oil.

8. The structure according to claim 1, wherein the structure is a container, and said liquid film is formed on an inner surface of the container.

9. The structure according to claim 1, wherein when the structure on which 6 mg of pure water is placed is inclined at an angle of inclination of 30°, the slip-down velocity thereof is larger than the slip down velocity of when a liquid film of the same thickness is formed on the structure of which the surface has not been roughened.

* * * * *